(No Model.)
W. HEISER.
WOODEN VESSEL.
No. 425,032. Patented Apr. 8, 1890.
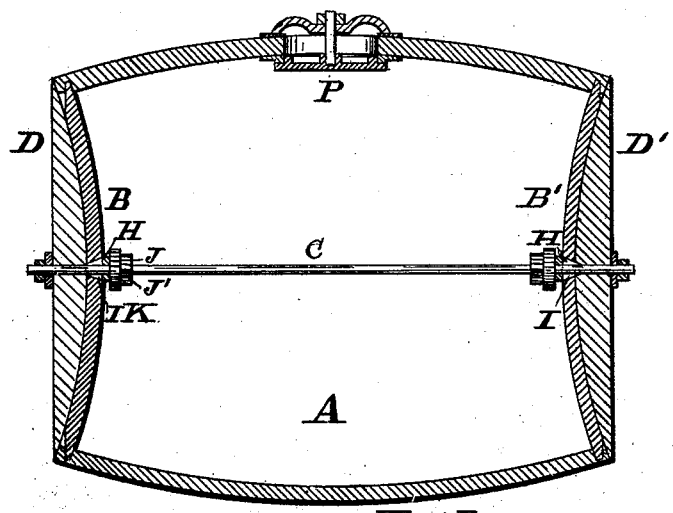
Fig.1.
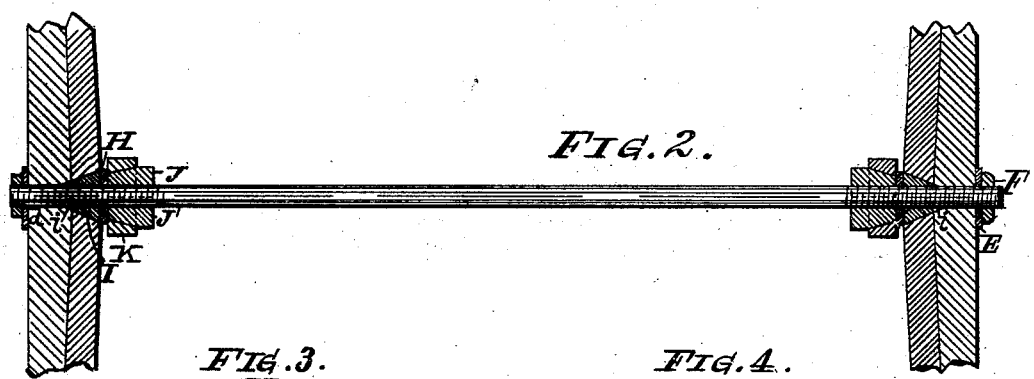
Fig.2.
Fig.3.
Fig.4.
Fig.5.
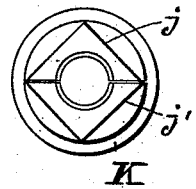
Witnesses: Inventor:
Michael J. Stark. William Heiser
Centie S. Stark. by Michael J & Wm O Stark
Attorneys.

UNITED STATES PATENT OFFICE.

WILLIAM HEISER, OF BUFFALO, NEW YORK.

WOODEN VESSEL.

SPECIFICATION forming part of Letters Patent No. 425,032, dated April 8, 1890.

Application filed January 29, 1890. Serial No. 338,512. (No model.)

*To all whom it may concern:*

Be it known that I, WILLIAM HEISER, of Buffalo, in the county of Erie and State of New York, have invented certain new and useful Improvements in Wooden Vessels; and I do hereby declare that the following description of my said invention, taken in connection with the accompanying sheet of drawings, forms a full, clear, and exact specification, which will enable others skilled in the art to which it appertains to make and use the same.

This invention has general reference to improvements in beer-casks, hogsheads, and similar vessels; and it consists, essentially, in the novel and peculiar combination of parts and details of construction, as hereinafter first fully set forth and described, and then pointed out in the claims.

In the drawings heretofore mentioned, Figure 1 is a longitudinal central section of a beer-cask or similar vessel embodying my invention. Fig. 2 is a similar view of the tensioning device for the heads, drawn to an enlarged scale. Fig. 3 is a side elevation of the split nut and fastening used on the above tensioning device. Fig. 4 is an end view of the same. Fig. 5 is a longitudinal central section of the said nut.

The object of my present invention is the production of a cheap and efficient fastening for use on the tensioning-rods of beer-casks, &c., whereby the insertion of the rods and tensioning of the heads are facilitated. To attain this result, I construct my device substantially as illustrated in the drawings, in which—

A is the usual cask, hogshead, and the like provided with the customary heads B B', said cask being provided with a man-hole and cover P. Across the heads B B' are fastened brace-timbers D D' of the usual construction. In the center of the heads B B' and brace-timbers D D' are located apertures $i$, for the reception of the brace or tensioning rod C, the inner ends of said apertures being formed conical for a plug I. The brace-rod C is provided with screw-threads $d$ on both ends, and is passed through the cask and heads thereof and provided on the outside of the brace-timbers D D' with washers E, upon which bear nuts F, whereby the heads are prevented from expanding. On the interior of the cask and fitting the conical apertures in the heads B B' are provided taper plugs I, of rubber or other elastic material, upon which bear washers or apertured metal plates H.

J J' are the two halves of the tensioning-nut to expand the heads, said nuts being provided with a tapered portion on one end and with angular wrench-sections $j\ j'$ on the other. Over the tapered or conical portion of this nut fits an internally-tapered ring K, whereby when the nut is placed upon the rod adjacent to the washer H, while the ring K is placed over the taper portion of the nut and contiguous to the said washer and the said nut turned, the said ring will be forced onto the nut and will close the same, when by continued turning of the nut the plug I will be forced into its aperture, making a tight joint, and the head expanded to any desired extent. This ring K not only holds the nut together, but clips the same so tightly as to perform the functions of a lock for the nut.

To apply my rod to the cask, I proceed as follows: I drive the rod through the aperture in one head and then enter the cask through the man-hole P to place the plugs and washers I H, respectively, and the rings K of the nuts over the rod, after which I drive the rod through the other head and place the washers E and nuts F over the ends of the same, and screw the nuts tightly against the said washers and the brace-timbers. I now drive the plugs I into their respective apertures and force the washers H against the same. Then I place the two halves of each nut on the rod in the interior of the cask and push the said nuts into their respective rings, which were previously placed contiguous to the washers H. This done, I revolve the nuts by means of a wrench to close the said nuts, expand the heads, and make a tight joint at the rubber plugs, substantially as hereinbefore described.

It will now be readily observed that by constructing my device in the manner described I derive several advantages which I have heretofore been unable to accomplish, some of which may be enumerated, as follows: I can make the rod of ordinary round iron and cut the threads on the same in the usual screw-threading machine. I am enabled to produce the split nuts and their collars of malleable metal in the process of casting, so that no machine-work to speak of is required to finish the parts, thereby producing an expanding device for the heads that is far cheaper than any similar device heretofore constructed. I can, furthermore, fasten the rods in position in much less time than was heretofore required, for the reason that when solid rods were used the ordinary nuts on the inside of the cask had to be screwed from one end over the entire length of the thread, then slipped over the rod, which for this purpose was smaller than the threaded portion, and, finally, run onto the opposite thread, which was objectionable, especially so in confined places.

Having thus fully described my invention, I claim as new and desire to secure to me by Letters Patent of the United States—

1. In a barrel, the combination, with a single brace-rod screw-threaded at both ends and having nuts and washers at their outer extremities, of removable split nuts arranged to press against the inner face of the barrel-heads and having bands for uniting the same and angular wrench-sections on their exterior, whereby said nuts may be placed and secured upon the rod after the latter is in position, as set forth.

2. In a barrel, the combination, with the head and brace-timbers, of a brace-rod passing through the same and provided with nuts and washers at both ends, bearing against the outside of the brace-timbers, and with fastenings consisting of split nuts and uniting bands, and washers bearing against elastic plugs embedded in said heads on the inner sides thereof, as set forth.

3. A barrel consisting of staves, heads, and brace-timbers, a brace-rod consisting of a single piece screw-threaded on both ends and passing through said brace-timbers, nuts and washers on said rod at both ends outside of said brace-timbers, conical elastic plugs embedded on the inner side of the head, and a fastening bearing against said plugs, consisting of split nuts having a taper portion at one end and angular wrench-sections at the other, and taper rings for uniting the same, substantially as described.

In testimony that I claim the foregoing as my invention I have hereto set my hand in the presence of two subscribing witnesses.

WM. HEISER.

Attest:
MICHAEL J. STARK,
WM. O. STARK.